Feb. 27, 1940. J. C. SHUMWAY 2,191,503
TERMINAL
Filed July 13, 1938
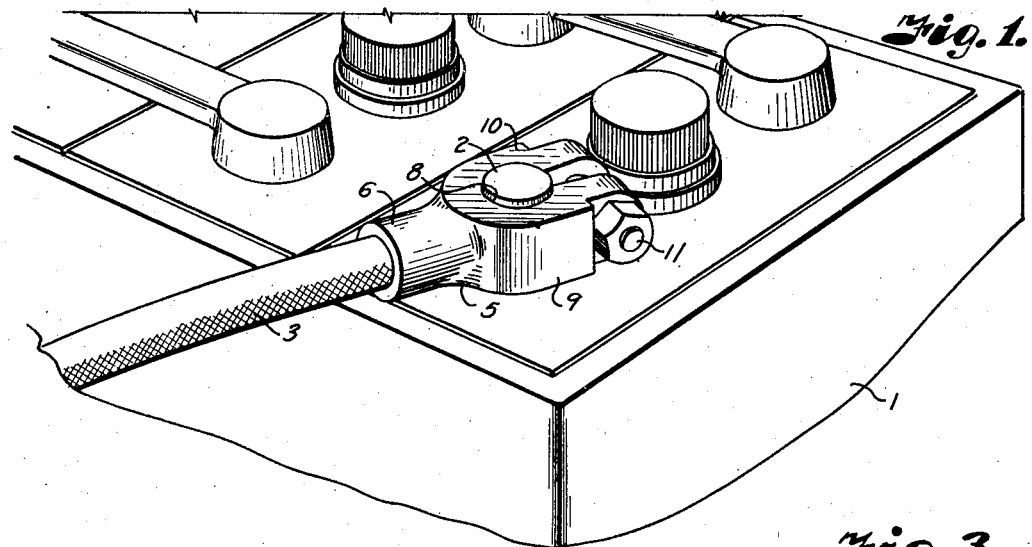
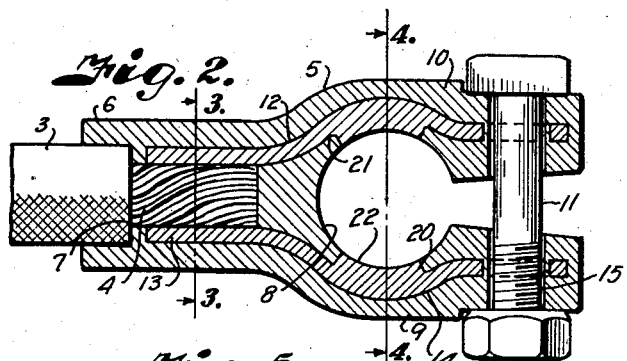
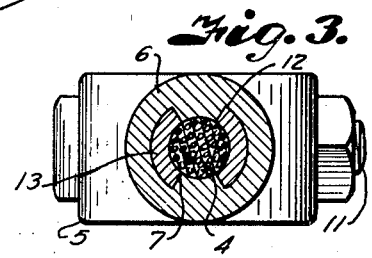
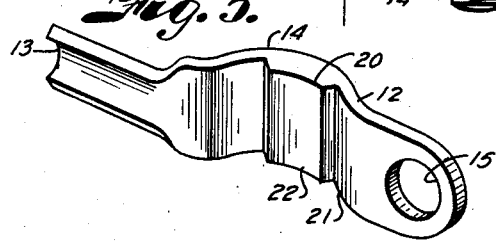
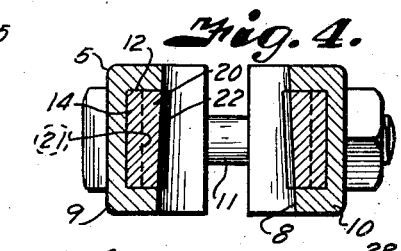
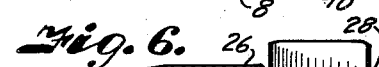
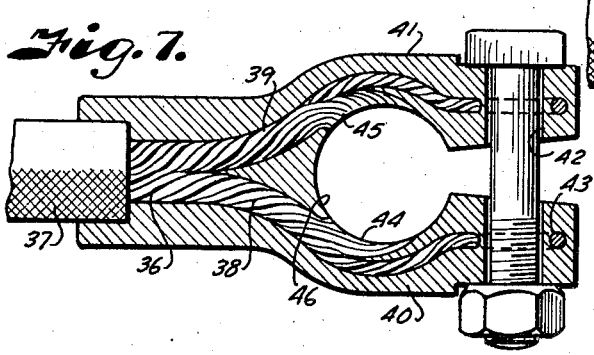
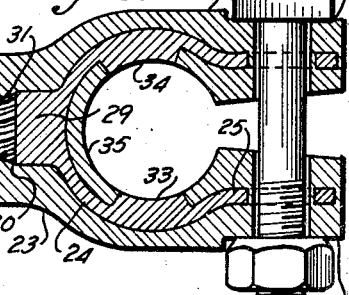
INVENTOR
Jay C. Shumway
BY
Arthur C. Brown
ATTORNEY Patented Feb. 27, 1940

2,191,503

UNITED STATES PATENT OFFICE 2,191,503

TERMINAL

Jay C. Shumway, Pittsburgh, Pa.

Application July 13, 1938, Serial No. 218,924

2 Claims. (Cl. 173—259)

This invention relates to terminals and more particularly to terminals for storage battery cables, the principal objects of the present invention being to provide a cable terminal characterized by the ability to transfer electric current from a battery post to a cable with a minimum amount of resistivity and a maximum amount of conductivity.

Other important objects of the present invention are to provide a cable terminal of non-corrosive character; to provide for maintaining the shape of the terminal; to provide a terminal for directly connecting the cable to the battery post; to provide a non-corrosive cable terminal with inserts of low resistance having portions directly engaging the battery post; to provide a cable terminal of highly conductive material having a non-corrosive coating with portions of the highly conductive material exposed for contact with a battery post; to increase the efficiency of cable terminals of this character; to improve the elements of a cable terminal; and to provide an improved arrangement of those elements in organizing a cable terminal having the stated characteristics in accordance with the present invention.

In accomplishing these and other objects of the present invention, I have provided improved details of structure, the preferred form of which are illustrated in the accompanying drawing, wherein:

Fig. 1 is a fragmentary perspective view of a storage battery having a cable terminal embodying the features of the present invention applied to a post thereof.

Fig. 2 is a horizontal cross-section through a cable terminal embodying the features of my preferred form of invention.

Fig. 3 is a vertical cross-section through the terminal and cable on the line 3—3, Fig. 2.

Fig. 4 is a vertical cross-section through the terminal on the line 4—4, Fig. 2.

Fig. 5 is a detail perspective view of one of my improved terminal inserts.

Fig. 6 is a horizontal cross-section through a modified form of terminal embodying the features of the present invention.

Fig. 7 is a horizontal cross-section through a further modified form of terminal embodying the features of my invention.

Referring more in detail to the drawing:

1 designates a conventional storage battery having the usual posts 2. 3 designates a cable including an encased bundle of wire strands 4, the strands 4 consisting of a material having a high degree of electrical conductivity, such as copper.

5, Figs. 1 to 4, inclusive, designates a terminal embodying the features of my preferred form of invention, the terminal being engaged with the cable and being engageable with one of the posts 2 of the storage battery for conducting electrical current from the storage battery for any suitable purpose.

As is customary in terminals of this character the cable end 6 of the terminal seals the end of the cable 3 and contacts the wires 4 as is illustrated at 7 in Figs. 2 and 3. The battery post end of the terminal is bowed or forked to provide an annular recess 8 between the arms 9 and 10 of the terminal, the recess being of a size adapting the terminal for snug fit upon the battery post 2.

The outer ends of the arms 9 and 10 of the terminal are provided with apertures for passing a fastening device 11, which is adapted, upon manipulation thereof, to clamp the terminal in fixed position on the post.

Terminals of this character are ordinarily formed of lead or other non-corrosive material or of copper and/or brass with a non-corrosive coating. It is well-known that lead and similar non-corrosive material is a poor conductor of electricity and that it has a high degree of resistivity. The non-corrosive material usually used is also so soft that it loses its shape after the terminal has been in use for a short time. Lead and similar materials have the advantage, however, of being non-corrosive by storage battery acids and like deteriorating effects and it is there customary to use such material for battery terminals.

In accordance with the present invention, an insert or inserts 12, Fig. 5, are embedded within the terminals 5, the requirements of the inserts 12 being low resistivity and high conductivity for overcoming the above noted disadvantage of lead and similar materials for this purpose. The inserts 12 should also have greater rigidity than the non-corrosive material for the purpose of maintaining the shape of the terminals over long periods of time and should also have low resistance to the passage of current. Copper is an example of a material meeting these requirements and I have therefore found it preferable to form the inserts 12 of copper or compounds thereof; however, other materials having the required characteristics may be used without departing from the spirit of my invention.

As particularly illustrated in Fig. 2, the rear ends 13 of the inserts have electrical contact with the cable wires 4. Each insert is bowed substantially centrally thereof as indicated at 14 and is provided at its forward end with an aperture 15 aligning with, but larger than the corresponding apertures in the arms 9 and 10 of the terminal for passing the fastening device 11 therethrough. As clearly shown in Figs. 2 and 3, the inserts 12 are substantially completely enclosed or embedded in the terminals 5 in such a manner that the deteriorating influences of storage battery acids cannot easily act on the material of which the inserts are formed. It is also apparent that by this structure, the inserts form a reinforcement for the terminals for maintaining the shape thereof.

In order to further overcome the high resistivity of the non-corrosive terminals, I have found it preferable to provide extensions 20 or the like on each insert 12 which extend laterally and inwardly relative to the inner faces 21 of the inserts a distance to substantially correspond to the surfaces of the annular recesses 8 in the terminals in such a manner that the faces 22 of the inserts form a continuation of the surfaces of the recesses 8 in the terminals.

In operation, the fastening device 11 of the terminal is loosened relative to the arms of the terminal and the terminal is applied to the battery post 2, after which it is clamped thereon by the fastening device. Electric current generated by the battery is transferred from the post 2 to the cable wires 4 and by reason of the low electrical resistance of the inserts 12, the current passes through the inserts rather than the terminal. Since copper is substantially one hundred percent efficient in conducting electricity, passage of the current through the inserts renders the terminals substantially one hundred percent efficient in conductivity. The inserts being completely enclosed within the terminals, with the exception of the extensions 20, deterioration thereof is impeded and the life of the terminal is thus prolonged. Another advantage resulting from the employment of this invention is that since the inserts have greater rigidity than the usual terminals, the shape of the terminals is maintained and their usefulness is thus greatly enhanced.

In Fig. 6, a modified form of the invention is illustrated wherein a terminal 23 is employed having the same general characteristics as the terminal 5 previously described.

In this instance, a clip-like insert 24 is employed of substantially horseshoe or U-shape, the ends 25 and 26 of which extend into the arms 27 and 28 of the terminal to reinforce and maintain the shape of the terminal. The base 29 of the insert in this form of the invention has electrical contact 30 with the cable wires 31 of the cable 32 and I have found it preferable to make this contact between the insert and the cable wires by an electric weld to insure positive contact.

In this instance, also, the inserts are completely encased within the terminals, with the exception of extensions 33 and 34, which extend laterally and inwardly of the arms of the insert and terminate in the plane of the face 35 of the recess formed between the arms 27 and 28 of the terminal. In this form of the invention the insert is primarily a cable terminal formed of copper or other material having the required characteristics with a coating of non-corrosive material thereon. The extensions are exposed surfaces of the copper terminal for direct contact with the battery post.

The operation of this modified form of invention is substantially similar to that of the preferred form of invention in that electric current passes from a battery post through the extensions 33 and 34 to the wires 31 of the cable to provide a highly efficient terminal.

In Fig. 7, a further modified form of invention is shown which employs the principles involved in the forms of invention previously described, but wherein the wires 36 of the cable 37 are employed as a reinforcement and have initial electrical contact with a battery post. This feature of the invention is carried out by separating certain of the strands of wires 36, as indicated at 38 and 39. A bundle of the separated strands 38, for example, is then encased within the arm 40 of the terminal, and the bundle 38 of strands is further separated as indicated at 41. Certain of these strands are extended through the arm 40 around the aperture 42 therein, as indicated at 43, to provide a reinforcement for the terminal arm for maintaining the shape of the terminal. Others of the strands, from the separation point 41, are extended inwardly for termination, as at 44 and 45, in the plane of the recess 46 formed between the arms 40 and 41 of the terminal.

In the operation of this form of the invention, the strands 44 and 45 correspond to the extensions of the inserts described in connection with the other forms of invention, current, when the terminal is applied to a battery post, passing through the wire strands of the cable directly from the battery to a mechanism to be energized by the flowing current.

In each form of the invention, a highly efficient conducting medium is employed in a terminal, which medium also reinforces the cable terminal. Flow of current is substantially unhindered and the non-corrosive qualities of conventional terminals are substantially retained.

What I claim and desire to secure by Letters Patent is:

1. In combination with a storage battery having a post, and a conductor cable formed of a bundle of wires, a terminal of non-corrosive material engaged with the wires and engageable with said battery post, and a highly conductive insert enclosed in the terminal, said insert contacting said wires and having an extension thereon, said extension extending laterally through the terminal to a point flush with the battery post engaging face thereof to contact said battery post simultaneously with said terminal.

2. An insert for a battery terminal having front and rear ends bowed intermediately thereof, and a coating surrounding the insert, the rear end of said insert having current conducting engagement with a battery cable, the bowed portion of said insert having an inwardly laterally disposed thickened portion forming an extension and a flush continuation of the surrounding coating for the insert and having exposed contact with a battery post for facilitating passage of current between the battery and the cable.

JAY C. SHUMWAY.